(12) United States Patent
Ogawa et al.

(10) Patent No.: US 8,512,562 B2
(45) Date of Patent: Aug. 20, 2013

(54) DRAIN MECHANISM AND FLUID FILTER INCLUDING DRAIN MECHANISM

(75) Inventors: Nobuhiro Ogawa, Aichi-ken (JP); Masahiro Tomita, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 832 days.

(21) Appl. No.: 12/363,998

(22) Filed: Feb. 2, 2009

(65) Prior Publication Data
US 2009/0206022 A1    Aug. 20, 2009

(30) Foreign Application Priority Data
Feb. 20, 2008 (JP) .................... 2008-039426

(51) Int. Cl.
*B01D 35/16* (2006.01)
(52) U.S. Cl.
USPC ........... 210/248; 210/232; 210/233; 210/234; 251/149.1; 251/149.6; 251/149.9
(58) Field of Classification Search
USPC .................. 210/232, 233, 234, 248
See application file for complete search history.

(56) References Cited

U.S. PATENT DOCUMENTS

| 4,581,135 A * | 4/1986 | Gerulis .................... 210/108 |
| 7,141,166 B2 * | 11/2006 | Sugiura et al. .............. 210/234 |
| 2005/0077253 A1 | 4/2005 | Sugiura et al. |

FOREIGN PATENT DOCUMENTS
JP    2005-111447 A    4/2005

OTHER PUBLICATIONS
English language Abstract and translation of JP 2005-111447 A.

* cited by examiner

*Primary Examiner* — Tony G Soohoo
*Assistant Examiner* — Peter Keyworth
(74) *Attorney, Agent, or Firm* — Greenblum & Bernstein P.L.C.

(57) ABSTRACT

A drain mechanism includes: a cap that is attached detachably to a case of a fluid filter and formed with a drain hole, and includes an engaging projecting portion to which an engaging portion of a drain pipe inserted into the drain hole is engaged; and a valve member that is provided in the interior of the cap so as to close the drain hole and displaced in a direction for releasing closure of the drain hole upon contact with a tip end portion of the pipe inserted into the drain hole. The valve member is provided with a holding recess portion for holding the tip end portion of the pipe. A contact portion contacted by the tip end portion of the pipe is provided inside the holding recess portion of the valve member. When a tip end side of the engaging portion of the pipe inserted into the drain hole is in contact with a rear end side of the engaging projecting portion of the cap, an interval between a contact tip end of the engaging portion and the engaging projecting portion and an open end of the holding recess portion of the valve member closing the drain hole is longer than an interval between the contact tip end of the engaging portion and the engaging projecting portion and a tip end of the pipe.

8 Claims, 5 Drawing Sheets

DRAIN MECHANISM AND FLUID FILTER INCLUDING DRAIN MECHANISM

INCORPORATION BY REFERENCE

The disclosure of Japanese Patent Application No. 2008-039426 filed on Feb. 20, 2008, including the specification, drawings and abstract is incorporated herein by reference in its entirety.

BACKGROUND OF THE INVENTION

1. Field of the Invention

The present invention relates to a drain mechanism and a fluid filter including the drain mechanism, and more particularly to a drain mechanism and a fluid filter including the drain mechanism with which a drain pipe can be inserted into a drain hole of a cap easily and with comparatively little force, and the drain pipe can be inserted straight and held securely.

2. Description of the Related Art

An oil filter having a drain mechanism for discharging oil remaining in the interior of a case during the replacement of a replaceable filter element is known as a conventional fluid filter (see Patent Document 1, for example).

Figure 7:
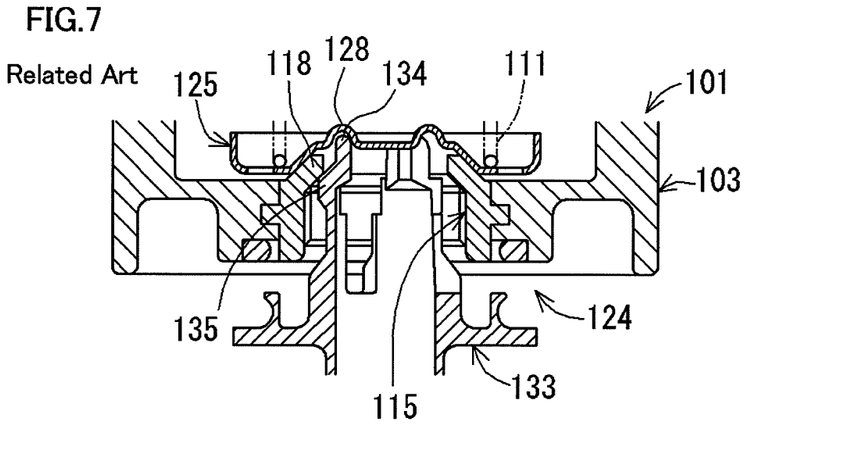
FIG. 7 is an enlarged sectional view of a conventional drain mechanism.

As shown in FIG. 7, for example, Patent Document 1 discloses a drain mechanism 124 having a cap 103 that is attached detachably to a case of an oil filter 101 and formed with a drain hole 115, and a valve member 125 provided in the interior of the cap 103 so as to close the drain hole 115, in which the valve member 125 is pushed upward against the biasing force of a spring 111 by a tip end portion 134 of a drain pipe 133 inserted into the drain hole 115, thereby opening the drain hole 115 such that oil remaining in the interior of the cap 103 is discharged via the drain pipe 133. When the remaining oil is discharged, an engaging portion 135 of the drain pipe 133 is engaged with an engaging projecting portion 118 of the cap 103, and the tip end portion 134 of the drain pipe 133 is held in a holding recess portion 128 of the valve member 125. Thus, the drain pipe 133 is fixed to the cap 103.

Patent Document 1: Japanese Patent Application Publication No. JP-A-2005-111447

Figure 8:
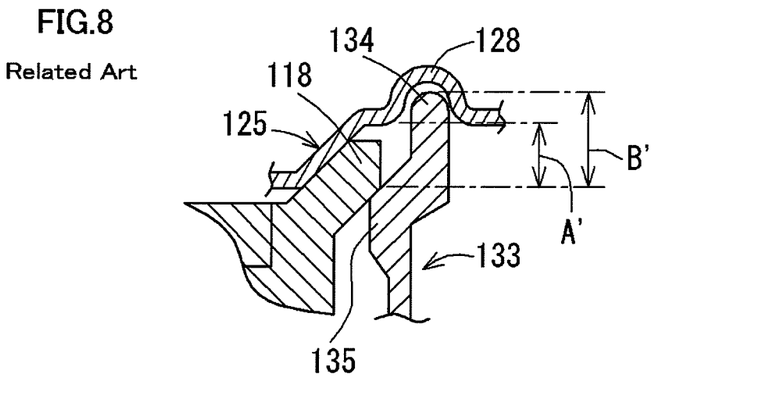
FIG. 8 is an enlarged view of the main parts of FIG. 7.
Figure 9:
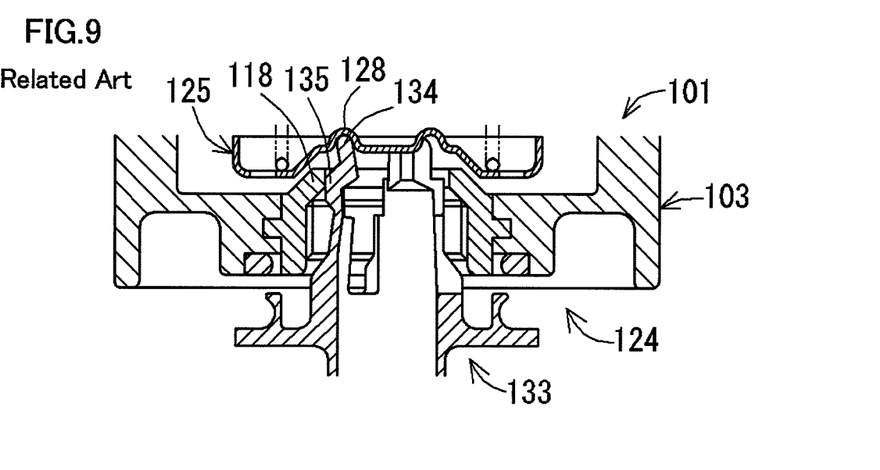
FIG. 9 is an illustrative view illustrating an action of the conventional drain mechanism.

As shown in FIG. 8, however, with the drain mechanism 124 of Patent Document 1, when a tip end side of the engaging portion 135 of the drain pipe 133 inserted into the drain hole 115 is in contact with a rear end side of the engaging projecting portion 118 of the cap 103, an interval A' between a contact tip end of the engaging portion 135 and the engaging projecting portion 118 and an open end of the holding recess portion 128 of the valve member 125 is set to be shorter than an interval B' between the contact tip end of the engaging portion 135 and the engaging projecting portion 118 and a tip end of the drain pipe 133, and therefore, when insertion of the drain pipe 133 progresses further, as shown in FIG. 9, the engaging portion 135 and the engaging projecting portion 118 can only be engaged by subjecting the drain pipe 133 to excessive elastic deformation while the tip end portion 134 of the drain pipe 133 is housed and held within the holding recess portion 128. Hence, a comparatively large force is required to insert the drain pipe 133, and therefore the drain pipe 133 cannot be inserted easily. Furthermore, since the drain pipe 133 cannot be inserted easily, the drain pipe 133 may not be inserted into the drain hole 115 straight. As a result, the tip end portion 134 of the drain pipe 133 may not be housed completely in the holding recess portion 128 and may fall out.

SUMMARY OF THE INVENTION

The present invention has been designed in consideration of the circumstances described above, and it is an object thereof to provide a drain mechanism and a fluid filter including the drain mechanism with which a drain pipe can be inserted into a drain hole of a cap easily and with comparatively little force, and the drain pipe can be inserted straight and held securely.

The present invention is as follows:

1. A drain mechanism for a fluid filter, comprising:
    a cap that is attached detachably to a case of a fluid filter and formed with a drain hole, and includes an engaging projecting portion to which an engaging portion of a drain pipe inserted into said drain hole is engaged; and
    a valve member that is provided in the interior of said cap so as to close said drain hole and displaced in a direction for releasing closure of said drain hole upon contact with a tip end portion of said drain pipe inserted into said drain hole, wherein
    said valve member is provided with a holding recess portion for holding said tip end portion of said drain pipe,
    a contact portion contacted by said tip end portion of said drain pipe is provided inside said holding recess portion of said valve member, and
    when a tip end side of said engaging portion of said drain pipe inserted into said drain hole is in contact with a rear end side of said engaging projecting portion of said cap, an interval (A) between a contact tip end of said engaging portion and said engaging projecting portion and an open end of said holding recess portion of said valve member closing said drain hole is longer than an interval (B) between said contact tip end of said engaging portion and said engaging projecting portion and a tip end of said drain pipe.

2. The drain mechanism for a fluid filter according to 1 above, wherein a projecting portion that projects toward said drain hole is provided inside said contact portion of said valve member.

3. The drain mechanism for a fluid filter according to 1 above, wherein an outer end side of said contact portion and an inner end side of said holding recess portion are connected by a curved surface portion.

4. The drain mechanism for a fluid filter according to 2 above, wherein an outer end side of said contact portion and an inner end side of said holding recess portion are connected by a curved surface portion.

5. A fluid filter comprising the drain mechanism according to 1 above.

6. A fluid filter comprising the drain mechanism according to 2 above.

7. A fluid filter comprising the drain mechanism according to 3 above.

8. A fluid filter comprising the drain mechanism according to 4 above.

According to the drain mechanism for a fluid filter of the present invention, when the tip end side of the engaging portion of the drain pipe inserted into the drain hole is in contact with the rear end side of the engaging projecting portion of the cap, the tip end portion of the drain pipe serves as a free end positioned on the outside of the holding recess portion of the cap, and when insertion of the drain pipe progresses further from this state, the engaging portion of the drain pipe is pressed against the engaging projecting portion of the cap, causing the drain pipe to deform elastically. As a result, the tip end portion of the drain pipe comes into contact with the contact portion, causing the valve member to displace in a direction for releasing the closure of the drain hole. The engaging portion of the drain pipe then passes over and engages with the engaging projecting portion of the cap, and the tip end portion of the drain pipe is held by the holding recess portion of the valve member. Thus, the engaging portion and the engaging projecting portion are engaged through easy elastic deformation of the drain pipe inserted into the drain hole using the tip end portion of the drain pipe as a free end, and therefore, the drain pipe can be inserted into the drain hole in the cap easily and with comparatively little force, and the drain pipe can be inserted straight and held securely by the holding recess portion. Moreover, the engaging portion of the drain pipe is engaged to the engaging projecting portion of the cap, and the tip end portion of the drain pipe is held by the holding recess portion of the valve member, and therefore the drain pipe can be held in the cap extremely firmly.

Further, in a case where the projecting portion that projects toward the drain hole is provided inside the contact portion of the valve member, the tip end portion of the drain pipe is brought into contact with the contact portion of the valve member and supported on the projecting portion when the valve member is displaced by the drain pipe, and therefore the drain pipe can be inserted in a straighter manner.

Further, in a case where the outer end side of the contact portion and the inner end side of the holding recess portion are connected by the curved surface portion, the tip end portion of the drain pipe can be moved smoothly from the contact portion to the holding recess portion via the curved surface portion, and the tip end portion of the drain pipe can be held securely by the holding recess portion.

According to the fluid filter of the present invention, when the tip end side of the engaging portion of the drain pipe inserted into the drain hole is in contact with the rear end side of the engaging projecting portion of the cap, the tip end portion of the drain pipe serves as a free end positioned on the outside of the holding recess portion of the cap, and when insertion of the drain pipe progresses further from this state, the engaging portion of the drain pipe is pressed against the engaging projecting portion of the cap, causing the drain pipe to deform elastically. As a result, the tip end portion of the drain pipe comes into contact with the contact portion, causing the valve member to displace in a direction for releasing the closure of the drain hole. The engaging portion of the drain pipe then passes over and engages with the engaging projecting portion of the cap, and the tip end portion of the drain pipe is held by the holding recess portion of the valve member. Thus, the engaging portion and the engaging projecting portion are engaged through easy elastic deformation of the drain pipe inserted into the drain hole using the tip end portion of the drain pipe as a free end, and therefore, the drain pipe can be inserted into the drain hole in the cap easily and with comparatively little force, and the drain pipe can be inserted straight and held securely by the holding recess portion. Moreover, the engaging portion of the drain pipe is engaged to the engaging projecting portion of the cap, and the tip end portion of the drain pipe is held by the holding recess portion of the valve member, and therefore the drain pipe can be held in the cap extremely firmly.

BRIEF DESCRIPTION OF THE DRAWINGS

FIG. 6 illustrates actions of the drain mechanism, FIG. 6A showing a state in which an engaging portion of a drain pipe is lifted onto an engaging projecting portion of a cap, FIG. 6B showing a state in which a valve member is pushed upward by a tip end portion of the drain pipe, and FIG. 6C showing a state in which the tip end portion of the drain pipe is held in a holding recess portion of the valve member;

DETAILED DESCRIPTION OF THE PREFERRED EMBODIMENTS

A drain mechanism for a fluid filter according to this embodiment includes a cap and a valve member to be described below.

There are no particular limitations on the structure, shape, material, and so on of the aforesaid "cap" as long as it is attached detachably to a case of the fluid filter and formed with a drain hole, and includes an engaging projecting portion to which an engaging portion of a drain pipe that is inserted into the drain hole is engaged. The engaging projecting portion may project toward the inside of the drain hole, for example. Further, the engaging portion may be provided on an outer periphery of a tip end side of the drain pipe so as to project outward, for example. Further, the tip end side of the drain pipe may be formed with a slit cut in an axial direction from the tip end of the drain pipe, for example. When the slit is formed, elastic deformation of the drain pipe becomes even easier.

There are no particular limitations on the structure, shape, material, and so on of the aforesaid "valve member" as long as it is provided in the interior of the cap so as to close the drain hole and oriented in a direction for releasing the closure of the drain hole upon contact with the tip end portion of the drain pipe inserted into the drain hole. The valve member is provided with a holding recess portion and a contact portion to be described below. The valve member may also be provided with a projecting portion to be described below, for example.

The valve member is normally biased in a direction for closing the drain hole by an elastic body such as a spring. The valve member may also close the drain hole through contact with the engaging projecting portion of the cap, for example.

There are no particular limitations on the structure, shape, disposal manner, and so on of the aforesaid "holding recess portion" as long as it holds the tip end portion of the drain pipe. The holding recess portion may be formed in a ring shape having a substantially identical size to the tip end portion of the ring-shaped drain pipe, for example. Further, a longitudinal cross-sectional shape of the holding recess portion may take a concave arc-shape that corresponds to the tip end portion of the drain pipe, which is formed with a convex arc-shaped longitudinal cross-section, for example. Thus, the tip end portion of the drain pipe can be held more securely by the holding recess portion.

There are no particular limitations on the structure, shape, disposal manner, and so on of the aforesaid "contact portion" as long as it is disposed on the inside of the holding recess portion of the valve member and contacted by the tip end portion of the drain pipe.

An outer end side of the contact portion and an inner end side of the holding recess portion may be connected by a curved surface portion, for example. The curved surface portion may be constituted by the outer end side of the contact portion and/or the inner end side of the holding recess portion, for example.

There are no particular limitations on the structure, shape, disposal manner, and so on of the aforesaid "projecting portion" as long as it is provided on the inside of the contact portion of the valve member so as to project toward the drain hole. Normally, the projecting portion supports the tip end portion of the drain pipe.

The projecting portion may have a tapered surface that decreases in diameter toward the drain hole, for example. Thus, even when the drain pipe is inserted diagonally into the drain hole, the tip end portion of the drain pipe can be guided by the projecting portion such that the tip end portion of the drain pipe contacts the contact portion in an appropriate position.

An outer end side of the projecting portion and an inner end side of the contact portion may be connected by a curved surface portion having a concave arc-shaped longitudinal cross-section corresponding to the tip end portion of the drain pipe, which is formed with a convex arc-shaped longitudinal cross-section, for example. Thus, the tip end portion of the drain pipe can be supported even more reliably by the contact portion and the projecting portion. The curved surface portion may be constituted by the inner end side of the projecting portion and/or the outer end side of the contact portion, for example.

Figure 4:
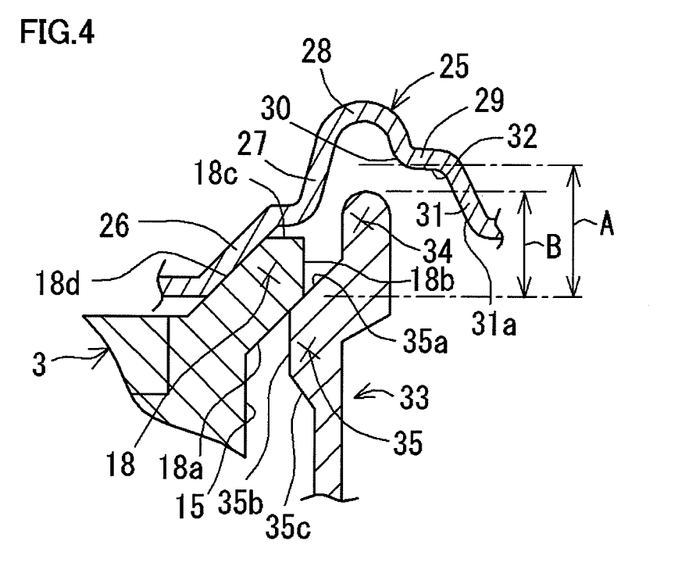
FIG. 4 is an enlarged view of the main parts of FIG. 3.

When a tip end side of the engaging portion of the drain pipe inserted into the drain hole is in contact with a rear end side of the engaging projecting portion of the cap, an interval (A) between a contact tip end of the engaging portion and engaging projecting portion and an open end of the holding recess portion of the valve member closing the drain hole is longer than an interval (B) between the contact tip end of the engaging portion and engaging projecting portion and the tip end of the drain pipe (see FIG. 4).

Figure 5:
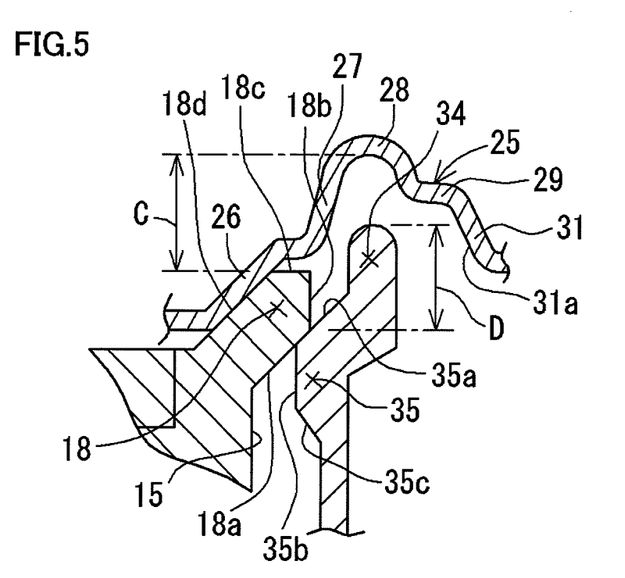
FIG. 5 is an enlarged view of the main parts of FIG. 3.

In this case, an interval (C) between an engagement end of the engaging projecting portion of the cap and a holding bottom end of the holding recess portion of the valve member closing the drain hole may be made longer than an interval (D) between the contact tip end of the engaging portion and engaging projecting portion and the tip end of the drain pipe, for example (see FIG. 5). Hence, in comparison with a mechanism in which the interval (C) is shorter than the interval (D), a displacement amount of the valve member can be suppressed to a required minimum, and the force required to insert the drain pipe can be reduced.

In an example of a drainage method for a fluid filter according to another embodiment employing the drain mechanism described above, the drain pipe is inserted into the drain hole in the cap such that the engaging portion of the drain pipe is pressed against the engaging projecting portion of the cap, causing the drain pipe to deform elastically. As a result, the tip end portion of the drain pipe comes into contact with the contact portion of the valve member, causing the valve member to displace in a direction for releasing the closure of the drain hole. When insertion of the drain pipe progresses further, the engaging portion of the drain pipe passes over the engaging projecting portion of the cap such that the engaging portion and the engaging projecting portion are engaged, and the tip end portion of the drain pipe is held by the holding recess portion of the valve member. Thus, the engaging portion and the engaging projecting portion can be engaged through easy elastic deformation of the drain pipe inserted into the drain hole using the tip end portion of the drain pipe as a free end, and therefore, the drain pipe can be inserted into the drain hole in the cap easily and with comparatively little force, and the drain pipe can be inserted straight and held securely by the holding recess portion. Furthermore, since the engaging portion of the drain pipe is engaged to the engaging projecting portion of the cap and the tip end portion of the drain pipe is held in the holding recess portion of the valve member, the drain pipe can be held in the cap extremely firmly.

Embodiment

A specific embodiment of the present invention will now be described with reference to the drawings. Note that in this embodiment, an oil filter attached to a cylinder block of an internal combustion engine (not shown) is described as an example of the "fluid filter" according to the present invention.

(1) Constitution of Oil Filter

Figure 1:
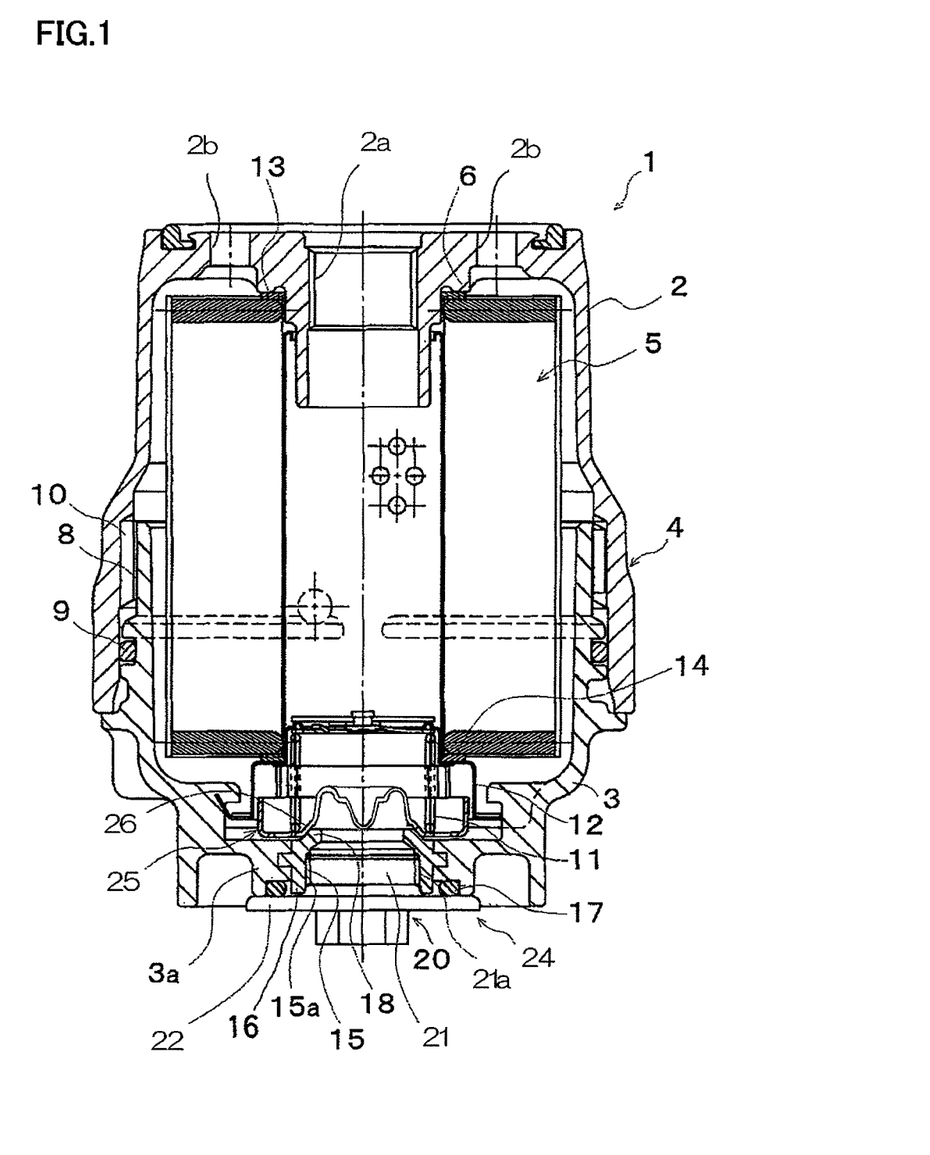
FIG. 1 is a longitudinal sectional view of an oil filter according to an embodiment.

As shown in FIG. 1, an oil filter 1 according to this embodiment is basically constituted by a closed-end tubular resin case 2 that opens downward, a closed-end tubular resin cap 3 that opens upward and is attached detachably to the case 2, and a chrysanthemum-shaped filter element 5 housed in the interior of a housing 4 constituted by the case 2 and the cap 3.

An outer peripheral surface of the cap 3 is formed with a male screw portion 8, and an O ring 9 is attached to the outer peripheral surface of the cap 3. Further, a female screw portion 10 is formed on an inner peripheral surface of the case 2. By screwing the male screw portion 8 to the female screw portion 10 such that the case 2 and cap 3 are engaged via the O ring 9, the interior of the housing 4 is held in a watertight state. In the interior of the housing 4, upper and lower end portions of the filter element 5 are sealed by a tubular body 12 biased by the biasing force of a spring 11 and a case projecting portion 6 provided in the case 2, via respective seal members 13 and 14. Further, an outflow port 2a for returning oil filtered by the filter element 5 to the internal combustion engine is formed on an upper portion center side of the case 2. Moreover, a plurality of inflow ports 2b for introducing polluted oil from the internal combustion engine into the case 2 are formed on the periphery of the outflow port 2a of the case 2.

A metal tubular member 16 is fixed integrally to a center hole in a bottom portion 3a of the cap 3 by insert molding. An inner peripheral side of the tubular member 16 serves as a drain hole 15 formed with a female screw 15a. Further, a seal member 17 such as an O ring is attached to a lower end side of the bottom portion 3a of the cap 3 so as to surround the drain hole 15. A metal drain bolt 20 is attached detachably to the drain hole 15. The drain bolt 20 includes a plug portion 21 formed with a male screw 21a on an outer peripheral side thereof, and a flange portion 22 formed as a continuation of a lower end side of the plug portion 21. When the male screw 21a of the drain bolt 20 is screwed to the female screw 15a of the drain hole 15 such that the drain bolt 20 is screwed to the drain hole 15, the drain hole 15 is closed by the plug portion 21 and the flange portion 22 presses against the seal member 17 such that the drain hole 15 is held in a watertight state.

Figure 2:
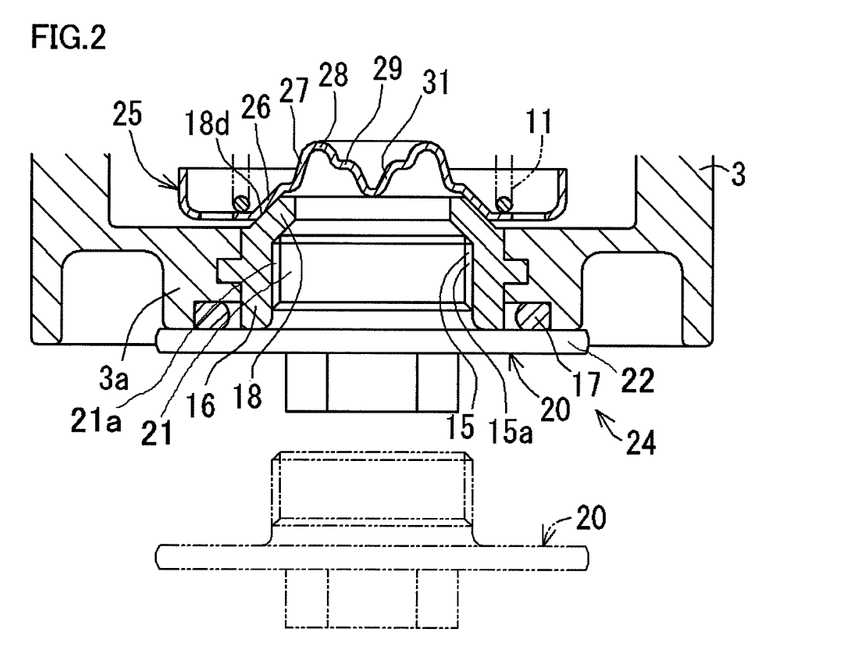
FIG. 2 is an enlarged view of the main parts of FIG. 1.

Further, an upper portion center side of the bottom portion 3a of the cap 3 is provided with a ring-shaped engaging projecting portion 18 to which an engaging portion 35 (see FIG. 3) of a drain pipe 33 is engaged. As shown in FIG. 2, the engaging projecting portion 18 projects toward the inside of the drain hole 15 and extends diagonally toward the case side. Further, as shown in FIG. 4, the engaging projecting portion 18 includes an inside inclined surface 18a extending at an incline relative to an axial direction of the drain hole 15, a first wall surface 18b formed as a continuation of an upper end side of the inside inclined surface 18a and extending in the axial direction of the drain hole 15, a second wall surface 18c formed as a continuation of an upper end side of the first wall surface 18b and extending in a substantially orthogonal direction to the first wall surface 18b, and an outside inclined surface 18d formed as a continuation of an outer end side of the second wall surface 18c and extending in a parallel direction to the inside inclined surface 18a.

Next, a drain mechanism 24 will be described. As shown in FIG. 2, the drain mechanism 24 includes a plate-shaped metal valve member 25 provided in the interior of the cap 3 so as to close the drain hole 15. The valve member 25 is supported in the interior of the tubular body 12 (see FIG. 1) to be free to move in an axial direction (the vertical direction of FIG. 2), and biased by the spring 11 in a direction (the downward direction in FIG. 2) for closing the drain hole 15. Further, the valve member 25 is provided with a tapered valve portion 26 that contacts the outside inclined surface 18d of the engaging projecting portion 18 described above. Hence, even when the drain bolt 20 is removed from the drain hole 15, the valve portion 26 of the valve member 25 biased by the spring 11 remains in contact with the outside inclined surface 18d of the engaging projecting portion 18, and therefore the drain hole 15 is maintained in a closed state.

As shown in FIG. 4, a holding recess portion 28 for holding a tip end portion 34 of the drain pipe 33 via a tapered wall 27 is provided on the inside of the valve portion 26 of the valve member 25. The holding recess portion 28 has a ring-shaped planar form with a substantially identical diameter to the tip end portion 34 of the drain pipe 33, the planar form of which is ring-shaped. Further, a longitudinal cross-section of the holding recess portion 28 takes the form of a concave arc corresponding to the tip end portion 34 of the drain pipe 33, the longitudinal cross-section of which takes the form of a convex arc. Further, a flat plate-shaped contact portion 29 contacted by the tip end portion 34 of the drain pipe 33 is provided on the inside of the holding recess portion 28 of the valve member 25. An outer end side of the contact portion 29 and an inner end side of the holding recess portion 28 are connected by a curved surface portion 30 having a convex arc-shaped longitudinal cross-section. Furthermore, a projecting portion 31 projecting toward the drain hole 15 is provided on the inside of the contact portion 29 of the valve member 25. The projecting portion 31 has a tapered surface 31a that decreases in diameter toward the drain hole 15. Further, an outer end side of the projecting portion 31 and an inner end side of the contact portion 29 are connected by a curved surface portion 32 having a concave arc-shaped longitudinal cross-section that corresponds to the tip end portion 34 of the drain pipe 33, the longitudinal cross-section of which takes the form of a convex arc.

Figure 3:
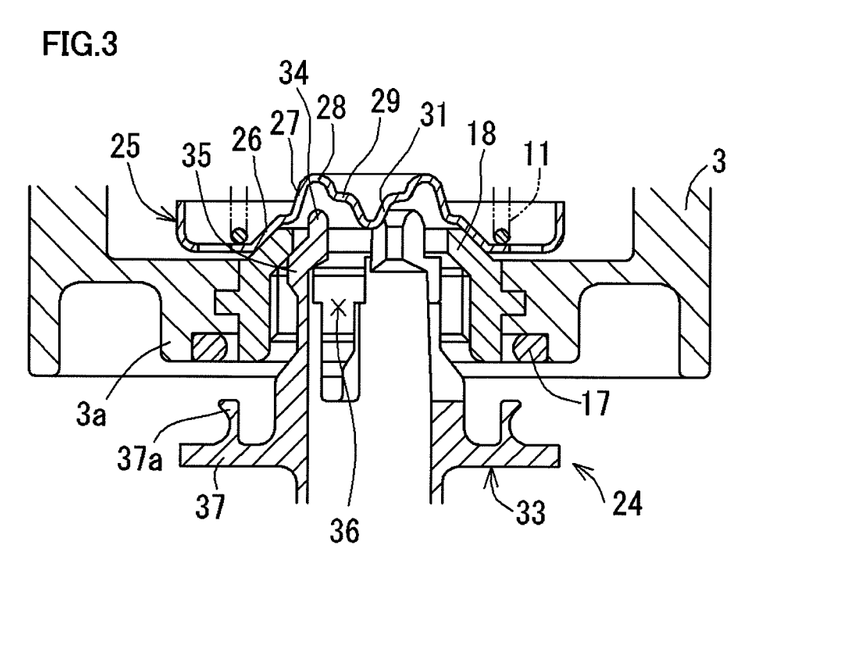
FIG. 3 is an illustrative view illustrating a drain mechanism according to the embodiment.

As shown in FIG. 3, the drain pipe 33 is made of resin and formed in a cylindrical shape having an outer diameter that allows insertion into the drain hole 15. A plurality of (three, for example) engaging portions 35 that swell outward are provided on a tip end side outer periphery of the drain pipe 33 at equal pitch intervals (120-degree intervals, for example) in a circumferential direction. Further, a plurality of (three, for example) slits 36 cut in an axial direction from the tip end of the drain pipe 33 are formed between the plurality of engaging portions 35 on the tip end side of the drain pipe 33. As shown in FIG. 4, each engaging portion 35 includes a tip end inclined surface 35a that extends at an incline relative to the axial direction of the drain pipe 33, a wall surface 35b that is formed as a continuation of a lower end side of the tip end inclined surface 35a and extends in the axial direction of the drain pipe 33, and a rear end inclined surface 35c that is formed as a continuation of a lower end side of the wall surface 35b and extends at an incline relative to the axial direction of the drain pipe 33. Further, a flange portion 37 is provided on an outer periphery of an axial direction intermediate portion of the drain pipe 33. An upright piece 37a that presses against and latches the seal member 17 on the bottom portion 3a of the cap 3 when the engaging portion 35 of the drain pipe 33 is engaged with the engaging projecting portion 18 of the cap 3 is provided on a front surface side of the flange portion 37 (see FIG. 6C).

As shown in FIG. 4, when the tip end inclined surface 35a serving as the tip end side of the engaging portion 35 of the drain pipe 33 inserted into the drain hole 15 is in contact with the inside inclined surface 18a serving as the rear end side of the engaging projecting portion 18 of the cap 3, an interval A between a contact tip end of the engaging portion 35 and engaging projecting portion 18 and an open end of the holding recess portion 28 of the valve member 25 closing the drain hole 15 is longer than an interval B between the contact tip end of the engaging portion 35 and engaging projecting portion 18 and the tip end of the drain pipe 33. Further, as shown in FIG. 5, an interval C between the second wall surface 18c serving as an engagement end of the engaging projecting portion 18 of the cap 3 and a holding bottom end of the holding recess portion 28 of the valve member 25 closing the drain hole 15 is longer than an interval D between the contact tip end of the engaging portion 35 and engaging projecting portion 18 and the tip end of the drain pipe 33.

(2) Actions of Oil Filter

Next, actions of the oil filter 1 will be described.

As shown in FIG. 1, during normal use of the oil filter 1 described above, the drain bolt 20 is attached to the drain hole 15 in the cap 3 via the seal member 17, and the drain hole 15 is closed by the drain bolt 20 and the valve member 25.

During an operation to replace the filter element 5, the O ring 9, the seal member 17, and the like, on the other hand, first, the drain bolt 20 is loosened and removed from the drain hole 15, as shown by an imaginary line in FIG. 2. At this time, the drain hole 15 is maintained in a closed state by the valve member 25 such that oil remaining in the interior of the housing 4 is not discharged through the drain hole 15.

Next, as shown in FIG. 3, the drain pipe 33 is inserted into the drain hole 15 such that the tip end side of the engaging portion 35 of the drain pipe 33 comes into contact with the rear end side of the engaging projecting portion 18 of the cap 3. At this time, the tip end portion 34 of the drain pipe 33 forms a free end positioned on the outside of the holding recess portion 28 of the valve member 25.

Figure 6A:
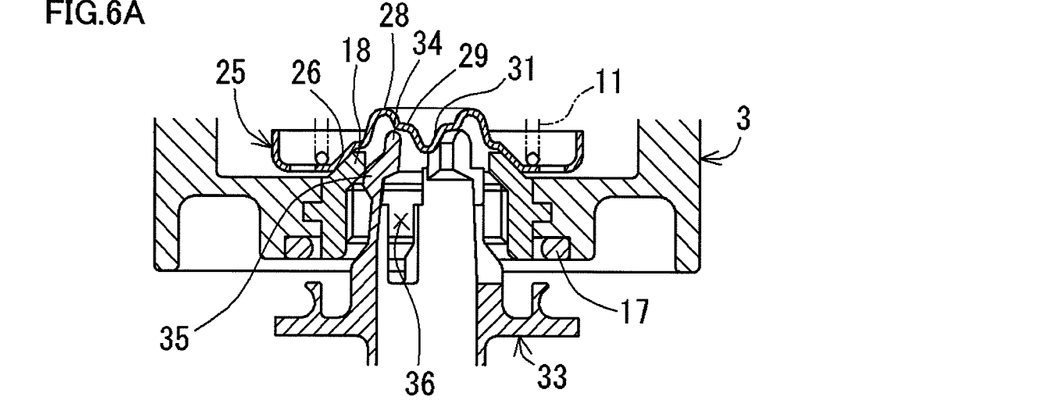
Figure 6B:
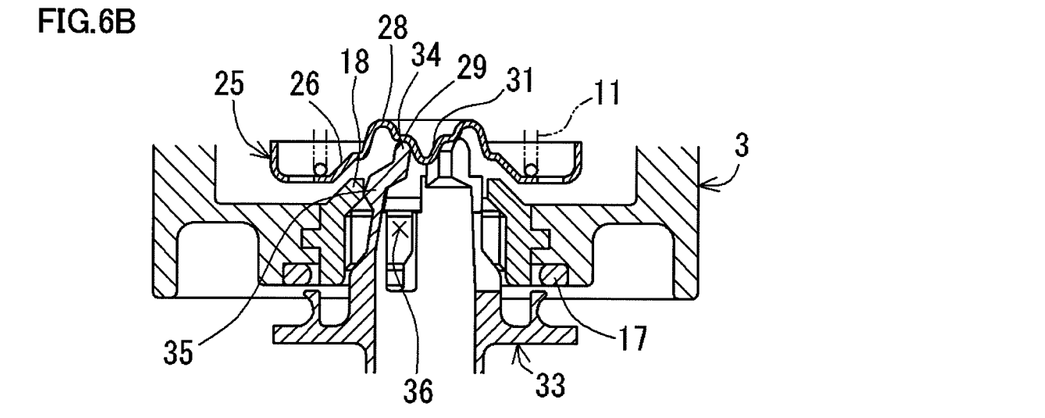

When insertion of the drain pipe 33 progresses further from this state, as shown in FIG. 6A, the drain pipe 33 is elastically deformed by the slits 36 such that the engaging portions 35 are lifted onto the engaging projecting portion 18. When insertion of the drain pipe 33 progresses further, as shown in FIG. 6B, the drain pipe 33 is subjected to further elastic deformation such that the tip end portion 34 of the drain pipe 33 comes into contact with the contact portion 29 and projecting portion 31 of the valve member 25, thereby pushing the valve member 25 upward and opening the drain hole 15. At this time, the oil remaining in the housing 4 starts to be discharged to the outside via the slits 36 and the center hole in the drain pipe 33.

Figure 6C:
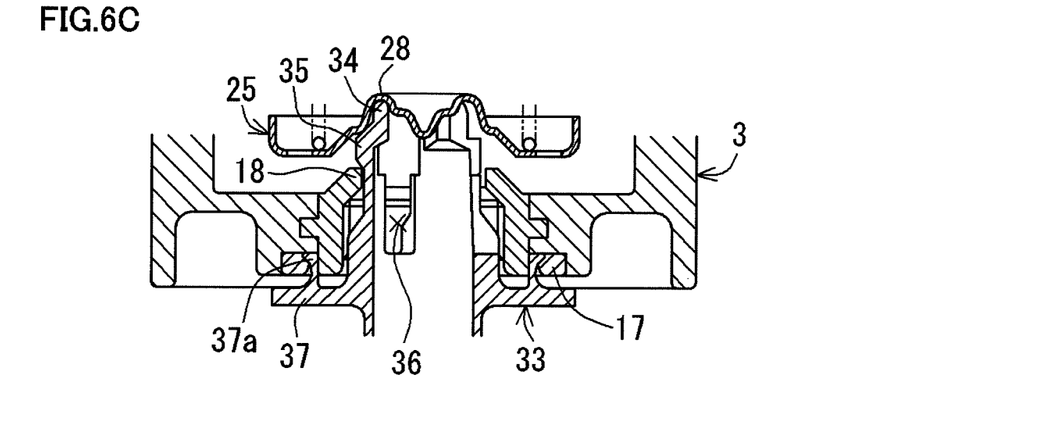

When insertion of the drain pipe 33 progresses further, as shown in FIG. 6C, the engaging portion 35 of the drain pipe 33 passes over the engaging projecting portion 18, whereby the engaging portion 35 is engaged with the engaging projecting portion 18 by an elastic restoration force of the drain pipe 33. At substantially the same time as the engaging portion 35 and engaging projecting portion 18 are engaged, the tip end portion 34 of the drain pipe 33 is housed and held in the interior of the holding recess portion 28, whereby the drain pipe 33 is fixed to the cap 3. The oil remaining in the interior of the housing 4 is then discharged via the slits 36 and the center hole in the fixed drain pipe 33.

Once discharge of the oil remaining in the interior of the housing 4 is complete, the drain pipe 33 is withdrawn from the drain hole 15, the cap 3 is loosened and separated from the case 2, and the operation to replace the filter element 5, O ring 9, seal member 17, or the like is performed. Note that the action for withdrawing the drain pipe 33 is performed in a substantially opposite order to the action for inserting the drain pipe 33, described above.

(3) Effects of the Embodiment

As described above, in the drain mechanism 24 according to this embodiment, the contact portion 29 contacted by the tip end portion 34 of the drain pipe 33 is provided on the inside of the holding recess portion 28 of the valve member 25, and when the tip end inclined surface 35a of the engaging portion 35 of the drain pipe 33 inserted into the drain hole 15 is in contact with the inside inclined surface 18a of the engaging projecting portion 18 of the cap 3, the interval A between the contact tip end of the engaging portion 35 and engaging projecting portion 18 and the open end of the holding recess portion 28 of the valve member 25 closing the drain hole 15 is longer than the interval B between the contact tip end of the engaging portion 35 and engaging projecting portion 18 and the tip end of the drain pipe 33. Therefore, the drain pipe 33 inserted into the drain hole 15 can be elastically deformed easily using the tip end portion 34 thereof as a free end, whereby the engaging portion 35 can be engaged to the engaging projecting portion 18. Hence, the drain pipe 33 can be inserted into the drain hole 15 in the cap 3 easily and with comparatively little force, and the drain pipe 33 can be inserted straight and held securely by the holding recess portion 28. Note that with the drain mechanism 24 according to this embodiment, it was possible to reduce the force required to insert the drain pipe to approximately ⅓ that of a mechanism such as the conventional mechanism shown in FIG. 9, in which an engaging portion 135 and an engaging projecting portion 118 are engaged by subjecting a drain pipe 133 to excessive elastic deformation while a tip end portion 134 of the drain pipe 133 is housed and held in a holding recess portion 128.

Further, in this embodiment, the cap 3 is provided with the engaging projecting portion 18 to which the engaging portion 35 of the drain pipe 33 is engaged, and the valve member 25 is provided with the holding recess portion 28 for holding the tip end portion 34 of the drain pipe 33. Hence, when the oil remaining in the interior of the housing 4 is discharged, the engaging portion 35 of the drain pipe 33 is engaged with the engaging projecting portion 18 of the cap 3, and the tip end portion 34 of the drain pipe 33 is held by the holding recess portion 28 of the valve member 25. Thus, the drain pipe 33 can be held in the cap 3 extremely firmly, and as a result, even when a lateral direction external force acts on the drain pipe, the drain pipe is unlikely to tilt, become disengaged, and so on.

Furthermore, in this embodiment, when the tip end inclined surface 35a of the engaging portion 35 of the drain pipe 33 inserted into the drain hole 15 is in contact with the inside inclined surface 18a of the engaging projecting portion 18 of the cap 3, the interval C between the second wall surface 18c of the engaging projecting portion 18 of the cap 3 and the holding bottom end of the holding recess portion 28 of the valve member 25 closing the drain hole 15 is longer than the interval D between the contact tip end of the engaging portion 35 and engaging projecting portion 18 and the tip end of the drain pipe 33, and therefore, in comparison with a mechanism in which the interval C is set to be shorter than the interval D, a displacement amount of the valve member 25 can be suppressed to a required minimum, and the force required to insert the drain pipe 33 can be reduced further.

Further, in this embodiment, the projecting portion 31 that projects while decreasing in diameter toward the drain hole 15 is provided on the inside of the contact portion 29 of the valve member 25, and therefore, when the valve member 25 is displaced by the drain pipe 33, the tip end portion 34 of the drain pipe 33 is brought into contact with the contact portion 29 of the valve member 25 and supported by the projecting portion 31. As a result, the drain pipe 33 can be inserted in a straighter manner. Furthermore, even when the drain pipe 33 is inserted into the drain hole 15 diagonally, the tip end portion 34 of the drain pipe 33 is guided by the tapered surface 31a of the projecting portion 31, and therefore the tip end portion 34 of the drain pipe 33 can contact the contact portion 29 in an appropriate position.

Moreover, in this embodiment, the outer end side of the projecting portion 31 and the inner end side of the contact portion 29 are connected by the curved surface portion 32 having a concave arc-shaped longitudinal cross-section corresponding to the tip end portion 34 of the drain pipe 33, the longitudinal cross-section of which takes the form of a convex arc, and therefore the tip end portion 34 of the drain pipe 33 can be supported by the contact portion 29 and the projecting portion 31 even more reliably, whereby the valve member 25 can be pushed upward in an even straighter manner.

Furthermore, in this embodiment, the outer end side of the contact portion 29 and the inner end side of the holding recess portion 28 are connected by the curved surface portion 30 having a convex arc-shaped longitudinal cross-section, and therefore, the tip end portion 34 of the drain pipe 33 can be moved smoothly from the contact portion 29 to the holding recess portion 28 via the curved surface portion 30 and the tip end portion 34 of the drain pipe 33 can be held within the holding recess portion 28 more reliably.

Note that the present invention is not limited to the embodiment described above, and may be implemented in various embodiments modified within the scope of the present invention according to object and application. More specifically, in the embodiment described above, an example in which the interval C between the engaging projecting portion 18 of the cap 3 and the holding recess portion 28 of the valve member 25 is longer than the interval D between the contact tip end of the engaging portion 35 and engaging projecting portion 18 and the tip end of the drain pipe 33 when the engaging portion 35 of the drain pipe 33 is engaged to the engaging projecting portion 18 of the cap 3 was described. However, the present invention is not limited to this example, and the interval C between the engaging projecting portion 18 of the cap 3 and the holding recess portion 28 of the valve member 25 may be shorter than the interval D between the contact tip end of the engaging portion 35 and engaging projecting portion 18 and the tip end of the drain pipe 33, for example.

Furthermore, in the embodiment described above, an example in which the projecting portion 31 is provided on the inside of the contact portion 29 as the valve member 25 was described, but the present invention is not limited to this example, and a valve member having the disc-shaped contact portion 29 but not including the projecting portion 31, for example, may be provided.

Moreover, in the embodiment described above, the engaging projecting portion 18 of the cap 3 functions as a valve seat of the valve member 25, but the present invention is not limited thereto, and a site other than the engaging projecting portion 18 may function as the valve seat of the valve member 25, for example.

The present invention may be used widely as a technique for discharging a fluid remaining in the interior of a filter for filtering the fluid. The present invention may be used particularly favorably as a technique for discharging oil remaining in the interior of an element replacement type oil filter employed in an internal combustion engine.

What is claimed is:

1. A drain mechanism for a fluid filter, comprising:
a cap that is attached detachably to a case of a fluid filter and formed with a drain hole, and includes an engaging projecting portion to which an engaging portion of a drain pipe inserted into said drain hole is engaged, said engaging projecting portion including an inclined rear side surface thereof and a contact end of said inclined rear side surface to which a contact tip end of said engaging portion of said drain pipe is engaged; and
a valve member that is provided in the interior of said cap so as to close said drain hole and displaced in a direction for releasing closure of said drain hole upon contact with a tip end portion of said drain pipe inserted into said drain hole, wherein
said valve member is provided with a holding recess portion for holding said tip end portion of said drain pipe,
a planar contact portion contacted by said tip end portion of said drain pipe is provided inside said holding recess portion of said valve member,
an open end of said holding recess portion of said valve member is defined by the plane formed by the planar contact portion,
an interval between said contact end of said inclined rear side surface of said engaging projecting portion to which said contact tip end of said engaging portion is engaged and the open end of said holding recess portion of said valve member defines an interval (A), and
an interval between said contact end of said inclined rear side surface of said engaging projecting portion to which said contact tip end of said engaging portion is engaged and said tip end portion of said drain pipe, when a tip end side of said engaging portion of said drain pipe inserted into said drain hole is in contact with said inclined rear side of said engaging projecting portion of said cap, defines an interval (B),
such that with said tip end side of said engaging portion of said drain pipe inserted into said drain hole in contact with said inclined rear side of said engaging projecting portion of said cap, said interval (A) is longer than said interval (B).

2. The drain mechanism for a fluid filter according to claim 1, wherein a projecting portion that projects toward said drain hole is provided inside said contact portion of said valve member.

3. The drain mechanism for a fluid filter according to claim 1, wherein an outer end side of said contact portion and an inner end side of said holding recess portion are connected by a curved surface portion.

4. The drain mechanism for a fluid filter according to claim 2, wherein an outer end side of said contact portion and an inner end side of said holding recess portion are connected by a curved surface portion.

5. A fluid filter comprising the drain mechanism according to claim 1.

6. A fluid filter comprising the drain mechanism according to claim 2.

7. A fluid filter comprising the drain mechanism according to claim 3.

8. A fluid filter comprising the drain mechanism according to claim 4.

* * * * *